G. L. PATTERSON.
MULTIPLE SERVICE BATTERY CABINET.
APPLICATION FILED AUG. 21, 1912.
1,064,370.
Patented June 10, 1913.
2 SHEETS—SHEET 1.
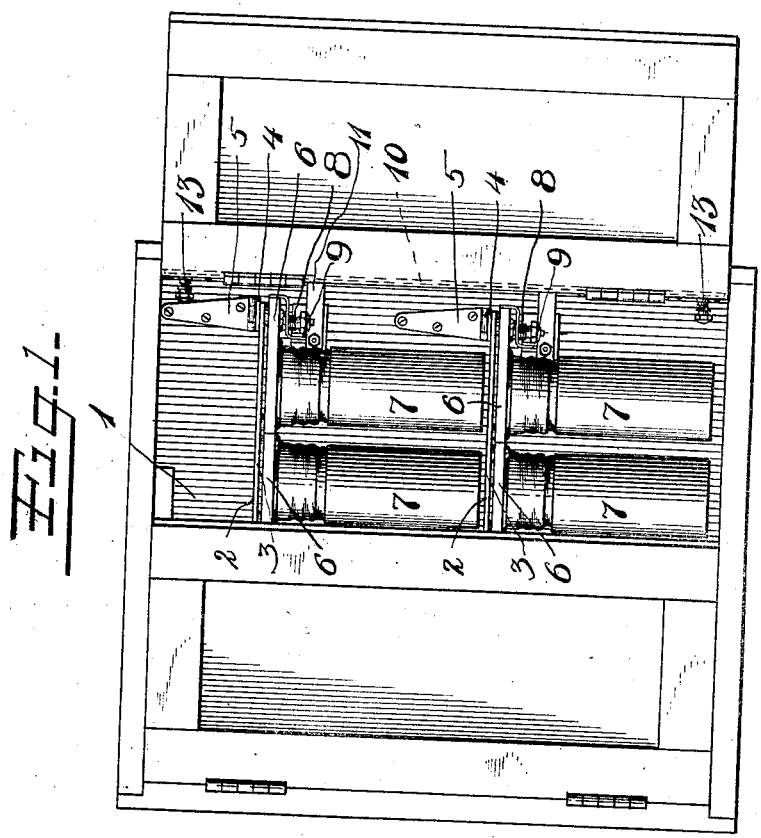
Witnesses:
Inventor
G. L. PATTERSON
By his Attorneys G. L. PATTERSON.
MULTIPLE SERVICE BATTERY CABINET.
APPLICATION FILED AUG. 21, 1912.
1,064,370.
Patented June 10, 1913.
2 SHEETS—SHEET 2.
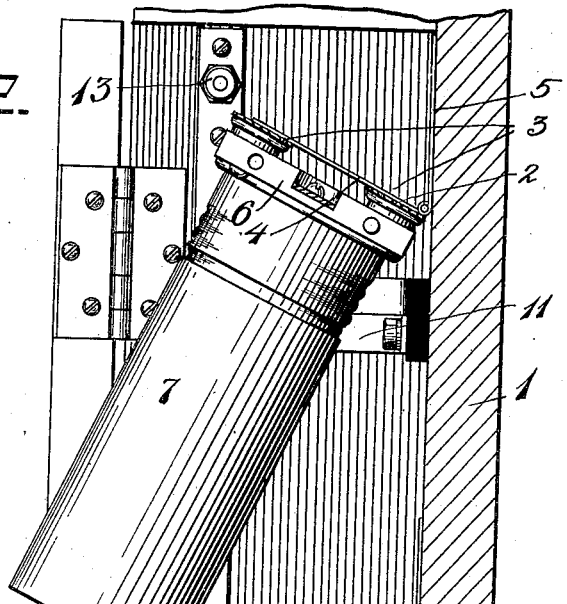
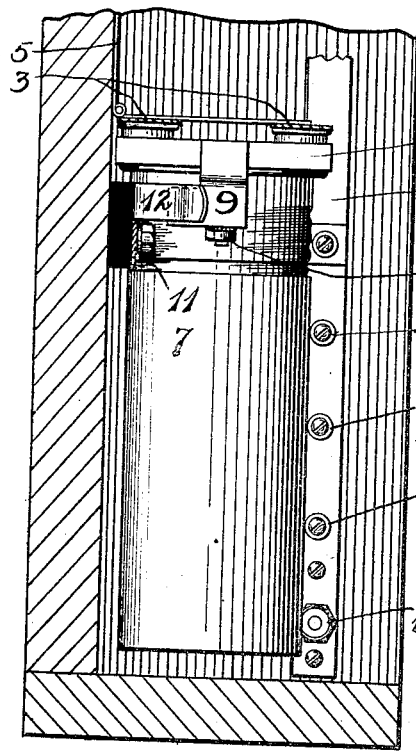
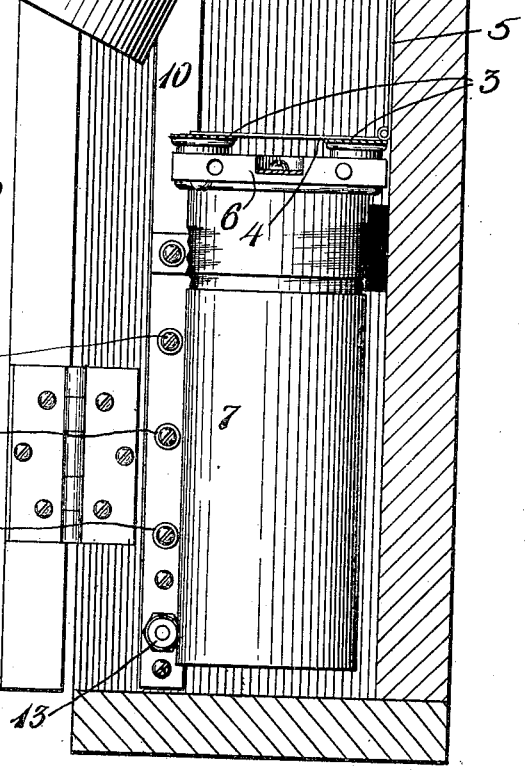
Witnesses:
Chas A Pearl
Ida M Hunziker
Inventor
G. L. Patterson
By his Attorneys
Bartlett, Brownell & Mitchell

UNITED STATES PATENT OFFICE.

GEORGE LEWIS PATTERSON, OF NEW YORK, N. Y., ASSIGNOR TO ALICE C. PATTERSON, OF NEW YORK, N. Y.

MULTIPLE-SERVICE-BATTERY CABINET.

1,064,370.  Specification of Letters Patent.  Patented June 10, 1913.

Application filed August 21, 1912. Serial No. 716,184.

*To all whom it may concern:*

Be it known that I, GEORGE L. PATTERSON, a citizen of the United States, residing at New York, county and State of New York, have invented certain new and useful Improvements in Multiple-Service-Battery Cabinets, of which the following is a full, clear, and exact description.

My invention relates to a cabinet or other suitable container for multiple series electric batteries, and in its broad aspect, embodies a plurality of series of multiple battery units, the units of each series being suitably connected and the series of units each being provided with means for interconnection and with suitable service terminals.

An embodiment of my invention is shown in the accompanying drawings, in which,

Figure 1 is a front elevation of a cabinet containing an embodiment of my invention, one of the doors being thrown open to disclose the interior arrangement. Fig. 2 is a vertical sectional view, and, Fig. 3 is a partial view in vertical section illustrating more particularly the knife switch connection between a bus bar and a series of battery units.

Referring to the drawings by numerals, 1 indicates a cabinet or other suitable container provided with a series of transversely extending battery supporting frames 2 arranged in superposed parallel relation. These frames, as illustrated, are formed of a plurality of transversely extending bars 3 secured together and to the wall of the container by hinge leaves 4 of hinges 5.

Secured preferably to the underside of these frames, I have shown a series of connected battery unit holders 6 adapted to receive dry cells 7 of the screw-top type shown in U. S. Patent No. 924,575, dated June 8th, 1909. This special form of battery holder, however, forms no part of the present invention, but will be made the subject-matter of a separate application. Generally speaking, these units each comprise an insulated head carrying therein positive and negative terminals with which the positive and negative terminals of these screw-top batteries contact when they are attached to the unit. One of the unit terminals projects from the insulated head and the other is seated within a recess formed in the head. There are plug and socket physical connections between the units, and the tongue terminal of one unit seats in the recess terminal of the adjacent unit so that the units are electrically connected. The end terminals of each series are of opposite polarity and connect with the positive and negative bus-bars as hereinafter described. The connections between the battery terminals and the terminals in the insulated head of each unit are substantially as illustrated and described in my prior Patent, No. 924,574, dated June 8th, 1909. I wish it understood that the framing is not limited to battery holders and batteries of any special type, and that the frames may be modified to adapt themselves to different batteries and different conditions and still be within the spirit of my invention.

The batteries, of whatever type employed, will be suitably connected together and each series of connected batteries is provided with end terminals 8 to which are secured contacts 9, preferably of the knife-edge type, the two end contacts 9 of each connected series being, of course, of opposite polarities.

Extending vertically of the cabinet and at each side of the series of battery supporting frames, are bus bars 10, one bar forming the negative terminal of each series and the other bar the positive terminal. These bus bars, at points adjacent the ends of the frames, are provided with strips 11 extending therefrom and provided with bifurcated contact members 12 adapted to coöperate with the knife-edge contacts 9 of the battery frames and form, in effect, a knife switch. At or adjacent the ends of the bus bars, service terminal connections 13 are provided and preferably also at points intermediate their ends additional service terminal connections as 14, 15 and 16.

It is believed that the operation of the device will be readily apparent. The frames carrying the batteries are hinged to the cabinet, as shown, and their knife-edge contacts forming the positive and negative terminals of each series engage with the contact members of the positive and negative bus bars, respectively, when the batteries are in their lowered or normal position, the weight of the batteries at the underside of the frames tending to maintain this lowered position. When it is desired to remove a battery, the frame as a whole may be lifted, swung upwardly on its hinges and the battery removed, the connection of the series of battery units in the frame with the bus bar being broken by the raising of the knife switch from its contact.

I have illustrated the battery carrying frames as being arranged in superposed parallel relation and with inter-connecting bus bars on the terminal sides of the frame. The invention, however, is not limited to this specific arrangement, but is susceptible of various modifications, one such, for instance, being the arrangement of the frames in longitudinal alinement with contacts between their adjacent ends and with one common bus bar for inter-connecting the end terminals of the plurality of series.

What I claim therefore and desire to secure by Letters Patent is:

1. In a device of the character described, a container, a plurality of supports movably mounted therein, a series of connected battery units carried by each support and provided with series terminals, means whereby said supports are normally held in a position to inter-connect said series terminals and service terminal connections for the plurality of series.

2. In a device of the character described, a container, a plurality of supports movably mounted therein, a series of connected battery units carried by each support and provided with series terminals, means whereby said supports are normally held in a position to interconnect said series terminals and means whereby said parts may be moved to disconnect said terminals, and service terminal connections for the plurality of series.

3. In a device of the character described, a container, a plurality of frames movably supported therein, a series of connected battery units carried by each frame and provided with series terminals, means adapted to inter-connect said series terminals when said frames are in normal position, and service terminal connections for the plurality of series.

4. In a device of the character described, a container, a plurality of independently movable frames supported therein, a series of connected battery units carried by each of said frames and provided with series terminals, means for interconnecting said series terminals, said means including a bus bar common to the plurality of series terminals, and service terminal connections for the plurality of series.

5. In a device of the character described, a container, a plurality of frames movably supported therein, a series of connected battery units carried by each of said frames and provided with series terminals, normally closed connections between the terminals of said plurality of series, said connections including a bus bar common to the plurality of series and contact members making connection therewith in the normal position of the battery carrying frame, and service terminal connections for the plurality of series.

6. In a device of the character described, a container, a plurality of frames hingedly mounted therein, a series of connected battery units carried by each frame and provided with series terminals, contact members carried by said frames and connected with said series terminals, bus bars common to the plurality of frames, contact members carried by said bus bars and positioned to connect with said frame contact members when said frames are in normal position, and service terminal connections for the plurality of series carried by said bus bars.

7. In a device of the character described, a container, a plurality of superposed frames hingedly mounted therein, a series of connected battery units secured to each of said frames and provided with series terminals, bus bars common to the plurality of frames and provided with contact members adjacent the terminal ends of said frames, contact members carried by said frames and in connection with the series terminals thereof, adapted, in the normal position of the frames, to engage with the contact members of the bus bars, and service terminal connections for the plurality of series carried by said bus bars.

8. In a device of the character described, a battery support comprising a plurality of transversely arranged superposed battery supports, electrical connectors associated with each support and arranged to receive and connect in series a plurality of battery units, said connectors for each support including positive and negative terminal connectors, and two main conductors, the positive terminal connector of each series being adapted to be electrically connected with one of said main conductors, and the negative terminal connector of each series being adapted to be electrically connected with the other main conductor.

GEORGE LEWIS PATTERSON.

Witnesses:
 CHAS. A. PEARD,
 IDA M. HUNZITER.